United States Patent
Mohapatra et al.

(10) Patent No.: US 10,250,692 B2
(45) Date of Patent: Apr. 2, 2019

(54) VOICE USER INTERFACE FOR PAIRING BETWEEN DEVICES

(71) Applicant: Sony Corporation, Tokyo (JP)

(72) Inventors: Bibhudendu Mohapatra, San Diego, CA (US); Max Jianhua Wu, San Diego, CA (US); Lobrenzo Wingo, San Diego, CA (US); Peter Andris Vanags, Cardiff, CA (US)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 15/494,076

(22) Filed: Apr. 21, 2017

(65) Prior Publication Data

US 2018/0309833 A1    Oct. 25, 2018

(51) Int. Cl.
| | |
|---|---|
| *G06F 15/16* | (2006.01) |
| *H04L 29/08* | (2006.01) |
| *G06F 3/16* | (2006.01) |
| *H04L 29/06* | (2006.01) |
| *H04W 12/06* | (2009.01) |

(52) U.S. Cl.
CPC ........... *H04L 67/141* (2013.01); *G06F 3/167* (2013.01); *H04L 63/0861* (2013.01); *H04L 67/146* (2013.01); *H04W 12/06* (2013.01)

(58) Field of Classification Search
CPC ............................ H04W 12/06; H04L 63/0861
See application file for complete search history.

(56) References Cited

U.S. PATENT DOCUMENTS

| | | | |
|---|---|---|---|
| 9,596,708 B2 | 3/2017 | Logue et al. | |
| 2002/0090912 A1* | 7/2002 | Cannon | H04L 29/12009 455/41.2 |
| 2011/0258689 A1* | 10/2011 | Cohen | H04L 63/061 726/7 |
| 2012/0223883 A1* | 9/2012 | Solomon | G06F 3/0383 345/157 |
| 2013/0185559 A1* | 7/2013 | Morel | H04L 63/18 713/168 |
| 2014/0046664 A1* | 2/2014 | Sarkar | H04W 12/06 704/246 |
| 2015/0189006 A1 | 7/2015 | Smus et al. | |
| 2015/0312951 A1 | 10/2015 | Locker et al. | |
| 2016/0308858 A1 | 10/2016 | Nordstrom et al. | |
| 2016/0366713 A1 | 12/2016 | Sonnino et al. | |

* cited by examiner

*Primary Examiner* — Kyung H Shin
(74) *Attorney, Agent, or Firm* — John L. Rogitz (57) ABSTRACT

A code is generated by a primary cloud server and sent to a device to be controlled (controlee). The code is displayed and a user speaks the code to a controller device, such as a voice assistant (VA). The controller sends the spoken code via a third party server to the primary server and if the primary server identifies the code as being correct, a first step is complete. The controlee then generates a second code, sends it to the primary server and also displays it for a user to speak it to the controller, which sends the spoken second code to the primary server via the third party server. If the primary server identifies the second code as being correct, pairing is authorized between the controller and controlee. The first and second steps should be completed within a timeout period to be valid.

19 Claims, 7 Drawing Sheets

FIG. 5 Step 2

FIG. 7

FIG. 8  Step 2

VOICE USER INTERFACE FOR PAIRING BETWEEN DEVICES

FIELD

The present application relates to technically inventive, non-routine solutions that are necessarily rooted in computer technology and that produce concrete technical improvements.

BACKGROUND

Voice assistants (VA) such as Amazon Echo®, Apple Siri®, Microsoft Cortana®, and Google Assistant® enable users to speak queries into the VA, which returns, audibly and/or visually, responses to the spoken queries.

SUMMARY

As understood herein, VAs may additionally be used as an example of a controller to control another device ("controlee"). As also understood herein, it is important that the user has a good experience while performing the pairing between the controlee and the controller. At the same time, it is important that the pairing method is also secure. In other words, security in pairing competes with ease of use, because, for example, users dislike conventional security measures that require typing in username and password information to add a new device to a computerized ecosystem.

Accordingly, a system includes a controlee device, a controller device to control the controlee device, and a primary server. The controlee device is programmed with instructions to cause the controlee device to send a message including an identification of the controlee device to the primary server, which in turn is programmed with instructions to generate a first code and send the first code to the controlee device. The controlee device is programmed with instructions to present the first code such that a user can know the first code and speak it into the controller device, which is programmed with instructions to receive first speech and send a first signal to a network on which the primary server communicates representing the first speech. The primary server is programmed with instructions to receive the first signal from the controller device and to compare information in the first signal from the controller device to the first code. The primary server is programmed with instructions to associate the controller device with the controlee device responsive to identifying that the information in the first signal from the controller device matches the first code, and to then command the controlee device to commence a second pairing step. In response, the instructions of the controlee device cause it to generate a second code, present the second code, and send the second code to the primary server. The controller device being programmed with instructions to receive second speech and to send a second signal representative thereof to the network, with the primary server being programmed with instructions to receive the second signal from the controller device and to compare information in the second signal from the controller device to the second code. The primary server is programmed with instructions to authorize pairing of the controller device with the controlee device responsive to identifying that the information in the second signal from the controller device matches the second code.

In example embodiments, the primary server is programmed with instructions to command the controlee device to accept pairing with the controller device responsive to identifying that the information in the second signal from the controller device matches the second code. The primary server may be programmed with instructions to not authorize pairing of the controller device and controlee device responsive to a timeout period being exceeded. The controlee device may be programmed with instructions to present the first code visibly and/or audibly.

In example implementations, the first signal from the controller device includes a digitized representation of the first speech. The primary server may then execute speech recognition on the digitized representation of the first speech. In other example embodiments the first signal from the controller device includes an output of speech recognition executed by the controller device on the digitized version of the first speech.

The second code generated by the controlee device may be different from the first code generated by the primary server.

In another aspect, a device such as a controlee includes at least one computer medium that is not a transitory signal and that includes instructions executable by at least one processor to receive a first code from a primary server, display the first code, and also display a prompt to speak the first code to a controller device. The instructions are executable to generate a second code different from the first code, display the second code, and display a prompt to speak the second code to the controller device. The instructions are further executable to send the second code to the primary server, and responsive to receiving from the primary server a signal to pair with the controller device, pair with the controller device such that the instructions are executable to execute commands from the controller device.

In another aspect, a method preferably executed by a primary server includes generating a first code, sending the first code to a controlee device, and receiving a network signal including first information derived from speech received by a controller device. The method includes, responsive to identifying that the first information matches the first code, sending a message to the controlee device to generate a second code, and receiving a network signal including second information derived from speech received by the controller device. The method also includes, responsive to identifying that the second information matches the second code, sending a message to the controlee device to pair with the controller device.

The details of the present application, both as to its structure and operation, can be best understood in reference to the accompanying drawings, in which like reference numerals refer to like parts, and in which.

BRIEF DESCRIPTION OF THE DRAWINGS

DETAILED DESCRIPTION

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a UNIX operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Figure 1:
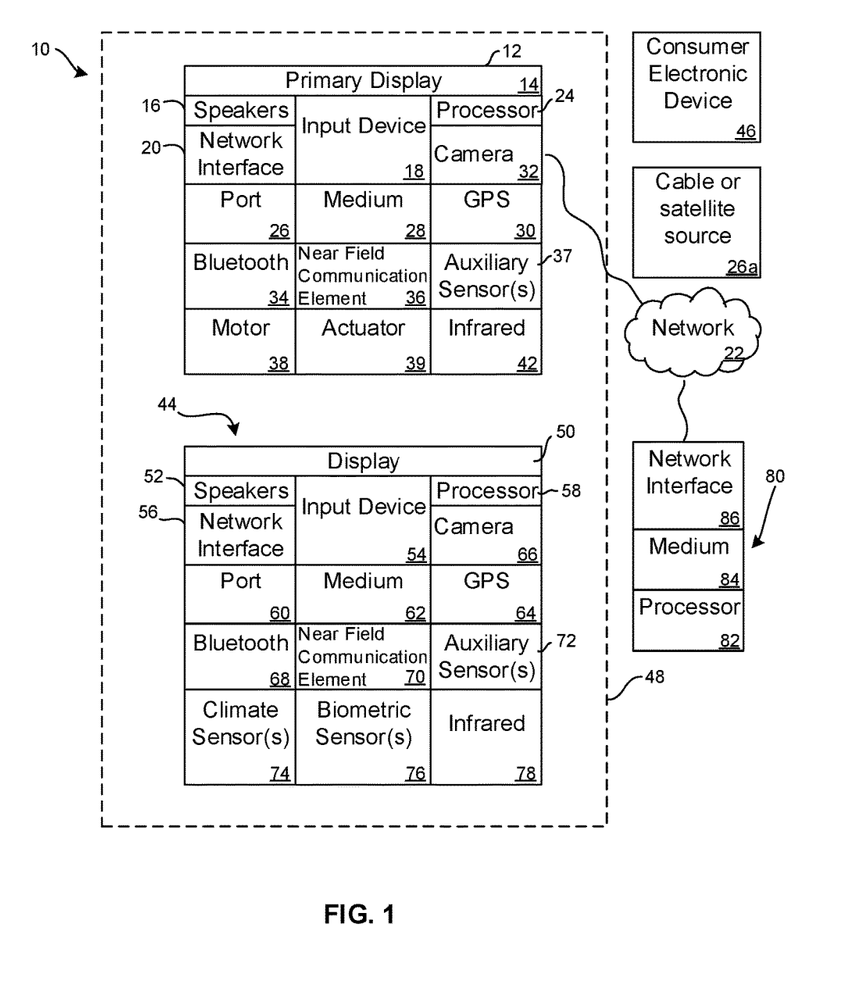
FIG. 1 is a block diagram of an example device.

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
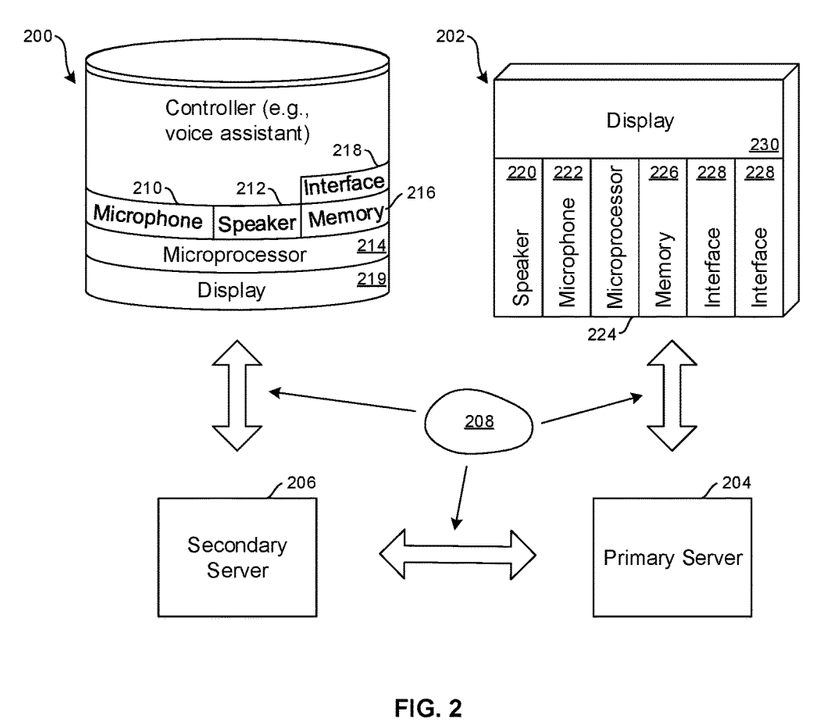
FIG. 2 is a block diagram of a system showing a controlled device ("controlee"), a controller device, a primary cloud server, and a secondary or third party cloud server, it being understood that more than the illustrated devices may be used.

FIG. 2 shows a controller 200 that can respond to voice commands to control a controlee 202. The controller 200 may be implemented by a voice assistant (VA) and the controlee 202 may be implemented by a large screen display assembly such as but not limited to a Sony display, it being understood that other devices may function as the controller and controlee. For example, the controlee may be implemented by a speaker without a visual display.

In the example shown, the controlee 202 communicates, typically wirelessly, with a primary cloud server 204 while the controller 200 communicates, typically wirelessly, with a secondary cloud server 206, also referred to herein as a third party server. The primary server 204 may be a server of the manufacturer of the controlee 202.

Wireless paths may also conjoin with wired paths. In the example shown, communication between the devices is over wireless and/or wired links 208 such as Internet links using, e.g., Wi-Fi or other appropriate communication protocols. Communication between the controller 200 and controlee 202 may be over a Bluetooth link or other Ethernet link or digital living network alliance (DLNA) link or other appropriate technology.

The devices shown in FIG. 2 may include some or all of the components disclosed in relation to FIG. 1. Thus, for example, the controller 200 may include one or more microphones 210 to receive speech input, one or more speakers 212 to output audible signals, and one or more microprocessors 214 accessing one or more storage media 216 to control the operation of the controller 200 consistent with principles herein. One or more network interfaces 218 such any one or a combination of the interfaces and transceivers discussed in relation to FIG. 1 may be implemented as shown for establishing communication with the controlee 202 and secondary server 206. In some examples the controller 200 may include a visual display 219 such as a liquid crystal diode (LCD) display or organic light emitting diode (OLED) display.

Similarly, the controlee 202 may include one or more speakers 220 to output audible signals, one or more microphones 222 to receive speech input, one or more microprocessors 224 accessing one or more storage media 226 to control the operation of the controlee 202 consistent with principles herein. One or more network interfaces 228 such any one or a combination of the interfaces and transceivers discussed in relation to FIG. 1 may be implemented as shown for establishing communication with the controller 200 and primary server 204. The controlee 202 may include a large flat panel display 230 such as a high definition (HD) or ultra high definition (UHD) television display or, as mentioned above, may be an audio speaker without a visual display. In some examples, the secondary server 206 may be omitted and the primary server 204 used exclusively.

Figure 3:
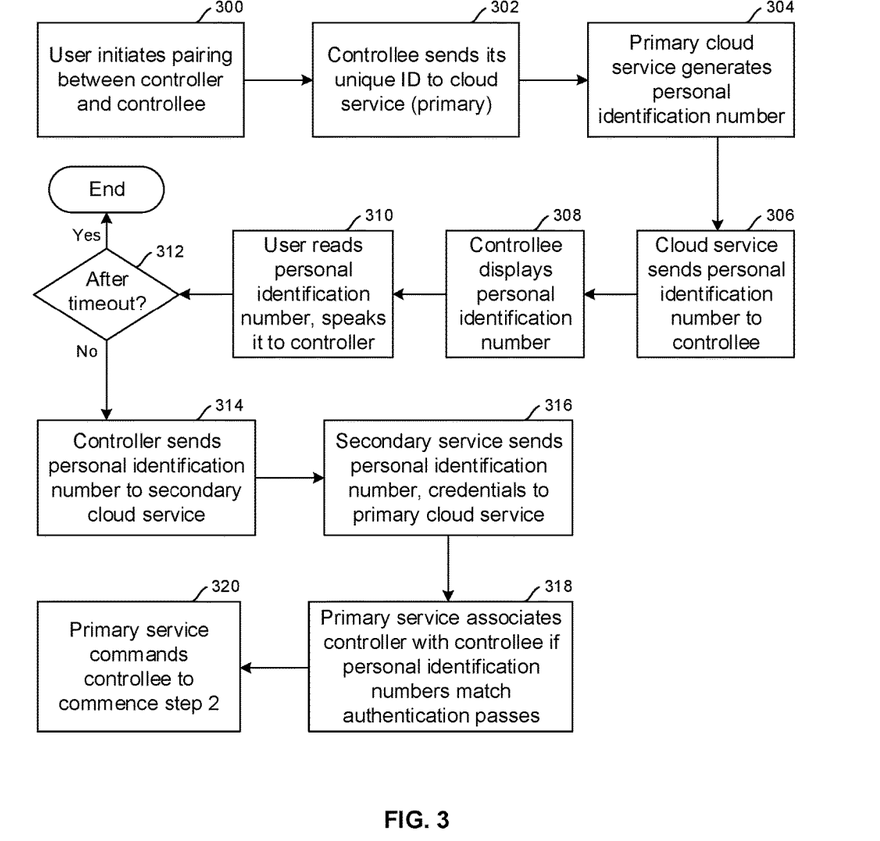
FIG. 3 is a flow chart of example logic consistent with present principles for executing a first pairing step.

For the controller 200 to be used to control the controlee 202 by means of, e.g., user voice input to the controller 200, pairing such as wireless pairing (using, e.g., Bluetooth pairing or other appropriate pairing) must be established. Such pairing preferably is both secure and easy for the user to execute. FIG. 3 illustrates a first step of a two-step pairing algorithm.

Commencing at block 300, a user initiates pairing on the controlee 202 using, e.g., a user interface (UI) with a selector for "pair with a VA". In response, at block 302 the controlee sends a message (including its unique identification such as a media access control (MAC) address or Android® ID) to the primary server 204. At block 304 the primary server 204 executing a primary service generates a first code, referred to herein for ease of description as a first "PIN" (personal identification number) that is sent back at block 306 to the controlee.

In example embodiments, the first code may be generated pseudo-randomly, with the first N digits of the generated PN being used as the first code, wherein N is an integer greater than zero. In an example, N=4. In another example, the first code is generated by hashing the unique controlee ID and using the first N digits of the resulting hash as the first code. Randomly selected numerals or groups of numerals in the first code may be converted to letters if desired by, e.g., replacing a numeral with a letter having a numeric position in the alphabet corresponding to the numeral. Other methods for generating an alpha-numeric string may be used.

Proceeding to block 308, the controlee displays the first code. The display may be audible and/or visual.

Figure 4:
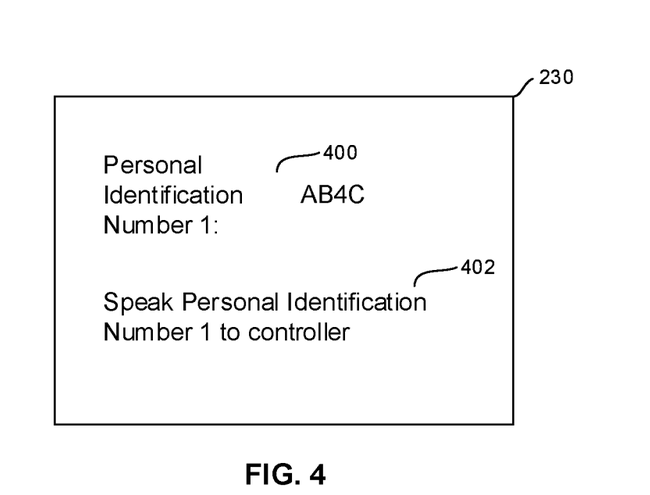
FIG. 4 is a screen of an example user interface consistent with the logic of FIG. 3, it being understood that the UI may be audibly presented on the controlee device in addition to or alternatively to presenting it visibly.

Referring briefly to FIG. 4, a visual presentation 400 on the display 230 of the controlee 202 is shown of a first code, in the example shown, the string "AB4C". A prompt 402 may be presented to prompt the user to speak the first code to the controller 200.

Referring back to FIG. 3, at block 310 it is assumed that the user responds to the prompt and speaks the first code to the controller 200. Decision diamond 312 reflects an example embodiment in which the process of the first pairing step depicted in FIG. 3 must be executed within a timeout period, e.g., thirty seconds or two minutes or other appropriate period for the user to speak to the controller. If the timeout period is exceeded, the logic can end, but otherwise at block 314 the controller sends the code received by the microphone of the controller 200 to the secondary server 206. Note that the controller 200 can send a digitized version of the received speech to the server 206 or can execute speech recognition on the received speech and send the resulting alpha-numeric string output by speech recognition to the server. When the digitized speech itself is sent, speech recognition may be executed at either one of the servers shown in FIG. 2, for example.

Moving to block 316, the secondary server 206 sends the first code to the primary server 204 along with the credentials of the secondary server 206 and/or the credentials of the user as obtained from the controller 200. At block 318 the primary server 204 associates the controller 200 uniquely with the controlee 202 responsive to authentication passing and the first code received from the secondary server 206 matching that which was sent to the controlee at block 306. No such association is established if either test fails. Concluding the first step at block 320, assuming the first code received from the secondary server 206 matches the first code sent to the controlee (and that authentication, when provided for, passes), the primary server 204 commands the controlee 202 to commence a second pairing step, depicted in FIG. 5.

Figure 5:
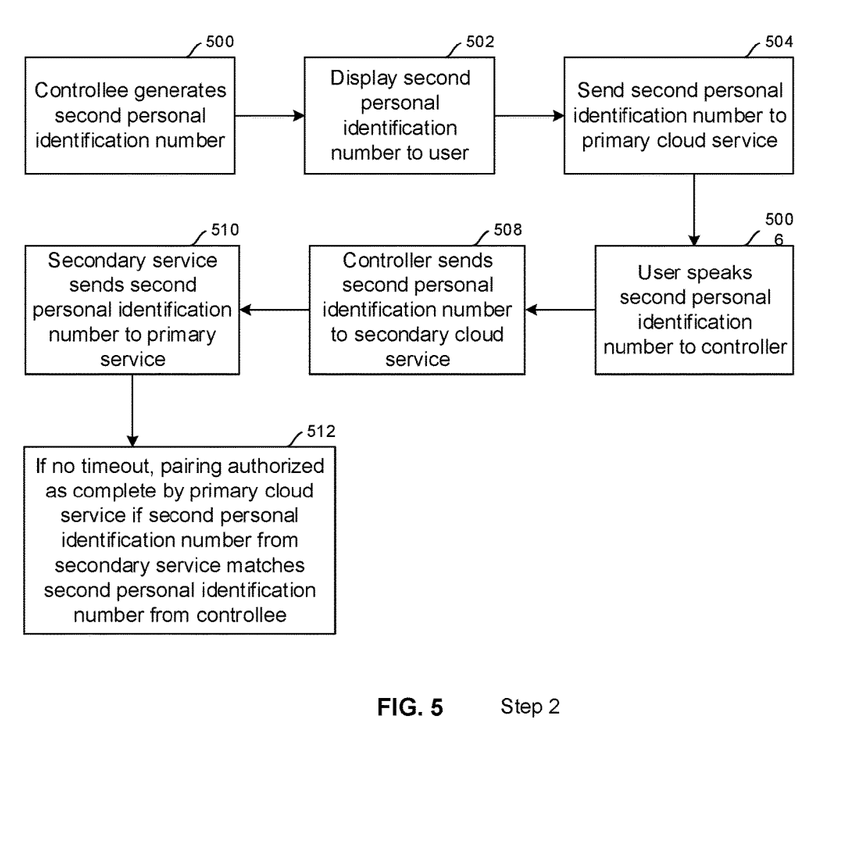
FIG. 5 is a flow chart of example logic consistent with present principles for executing a second pairing step.

Responsive to receiving the command from the primary server 204, at block 500 in FIG. 5 the controlee 202 generates a second code, which can be different from the first code if desired. The controlee can use any appropriate method for generating the second code such as any of the example methods described above. At block 502 the second code is presented audibly and/or visibly to the user and at block 504 the second code is also sent from the controlee 202 to the primary server 204.

Figure 6:
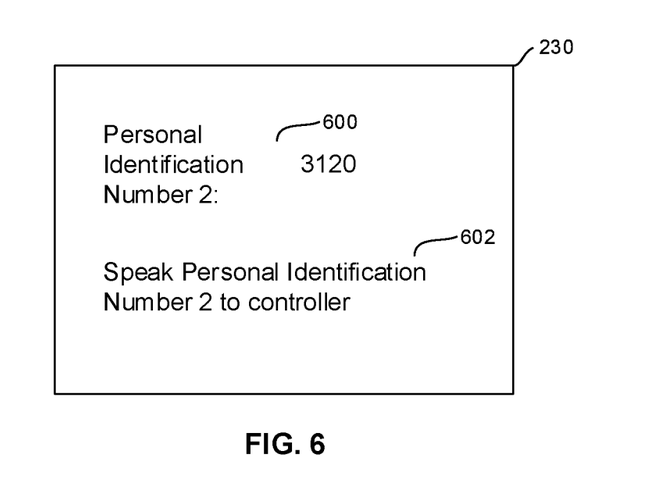
FIG. 6 is a screen of an example user interface consistent with the logic of FIG. 5, it being understood that the UI may be audibly presented on the controlee device in addition to or alternatively to presenting it visibly.

Referring briefly to FIG. 6, a visual presentation 600 on the display 230 of the controlee 202 is shown of a second code, in the example shown, the string "3120". A prompt 602 may be presented to prompt the user to speak the second code to the controller 200. Like the presentation in FIG. 4, the presentation in FIG. 6 may also or alternatively be presented audibly on one or more speakers.

Referring back to FIG. 5, at block 506 it is assumed that the user responds to the prompt and speaks the second code to the controller 200. Proceeding to block 508 the controller receives the spoken code and digitizes it, sending the digitized version (or the results of speech recognition performed thereon) to the secondary server 206, which sends the second code to the primary server 204 at block 510. At block 512 the primary server 204 identifies pairing as being authorized and informs the controlee of such to enable the controlee to respond to commands from the controller provided the second code received from the secondary server 206 matches that received by the primary server 204 at block 504.

Note that a timeout period may also be employed in the second step to ensure that the second step is executed relatively quickly after the first step. For example, a limited period may be provided between when the controlee is informed to commence the second step and when the second code is received by the primary server from the secondary server at block 510. Other start and end points of the timeout period may be used.

As envisioned herein, a two-step process as disclosed above understands that an intruder could try to exploit the code in the primary server and pretend to pair with the controlee. By adding a second step with a second code is generated from another source (in the example discussed, the controlee 202), the chances of intrusion are reduced.

Preferably, as described above pairing steps one (FIG. 3) and two (FIG. 5) are done one after another without much time difference in between them, or else pairing times out (fails).

Figure 7:
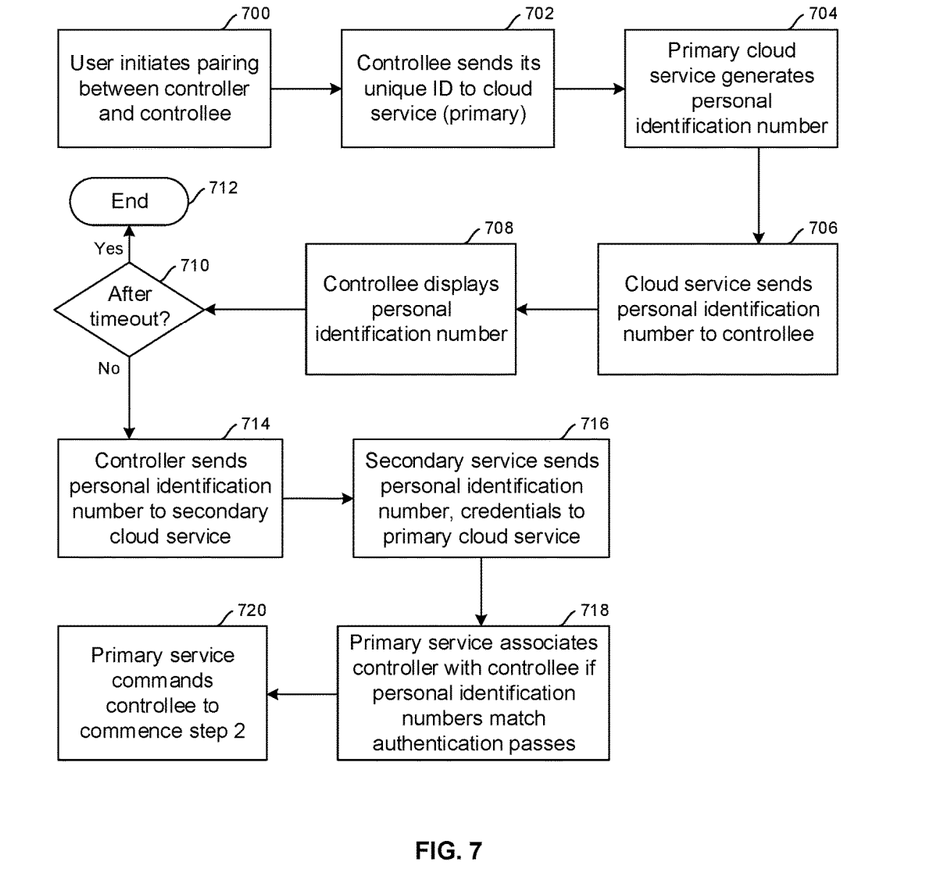
FIGS. 7 and 8 are flow charts of example alternate logic consistent with present principles.
Figure 8:
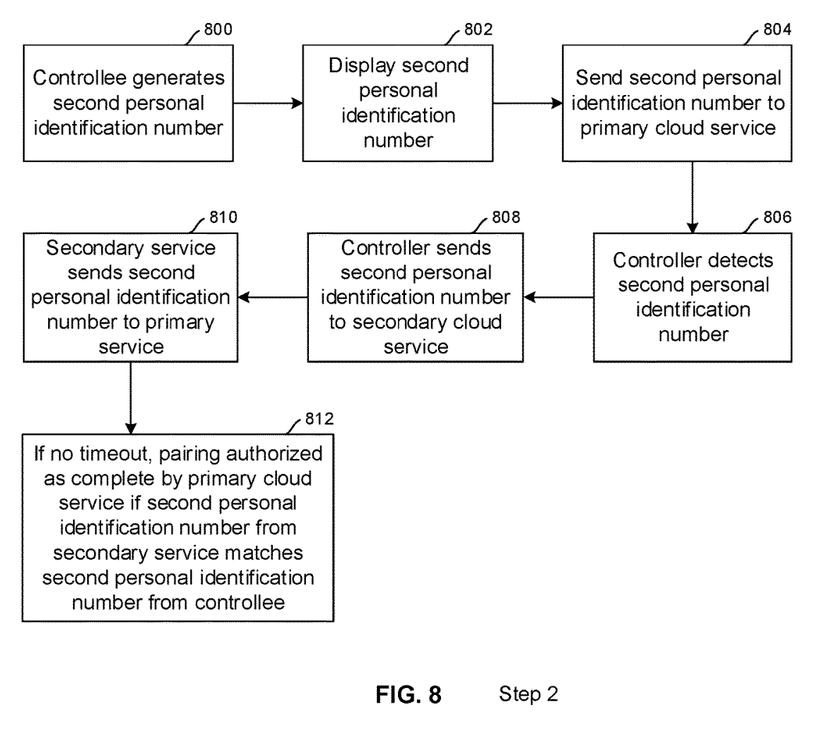

FIGS. 7 and 8 illustrate alternate logic in which the user need only initiate pairing, with subsequent steps being executed automatically by the controller and controlee as described below. Note that the above-mentioned timeouts may also be employed in the logic in FIGS. 7 and 8 at the appropriate steps.

Commencing at block 700, a user initiates pairing on the controlee 202. In one example, the user need only press a button or key on the controlee device, such as a button on a speaker, to do this, although in other implementations the user may access an audible or visual UI with a selector for "pair with a VA".

In response, at block 702 the controlee sends a message (including its unique identification such as a media access control (MAC) address or Android® ID) to the primary server 204. At block 704 the primary server 204 executing a primary service generates a first code, referred to herein for ease of description as a first "PIN" (personal identification number) that is sent back at block 706 to the controlee. The first code may be generated as disclosed above.

Proceeding to block 708, the controlee displays the first code. The display may be audible and/or visual. When the display is audible, the first code essentially is played on the speaker(s) of the controlee as speech.

Decision diamond 710 reflects an example embodiment in which the process of the first pairing step depicted in FIG. 7 must be executed within a timeout period, e.g., thirty seconds or two minutes or other appropriate period for the controlee to audibly present the first code to the controller. If the timeout period is exceeded, the logic can end at state 712, but otherwise at block 714 the controller, which has detected, via its microphones, the code that the controlee audibly presented, sends the code received by the microphone of the controller 200 to the secondary server 206. Note that the controller 200 can send a digitized version of the received speech to the server 206 or can execute speech recognition on the received speech and send the resulting alpha-numeric string output by speech recognition to the server. When the digitized speech itself is sent, speech recognition may be executed at either one of the servers shown in FIG. 2, for example.

Moving to block 716, the secondary server 206 sends the first code to the primary server 204 along with the credentials of the secondary server 206 and/or the credentials of the user as obtained from the controller 200. At block 718 the primary server 204 associates the controller 200 uniquely with the controlee 202 responsive to authentication passing and the first code received from the secondary server 206 matching that which was sent to the controlee at block 706. No such association is established if either test fails. Concluding the first step at block 720, assuming the first code received from the secondary server 206 matches the first code sent to the controlee (and that authentication, when provided for, passes), the primary server 204 commands the controlee 202 to commence a second pairing step, depicted in FIG. 8.

Responsive to receiving the command from the primary server 204, at block 800 in FIG. 8 the controlee 202 generates a second code, which can be different from the first code if desired. The controlee can use any appropriate method for generating the second code such as any of the example methods described above. At block 802 the second code is presented audibly and/or visibly. The second code may be presented audibly on the speaker(s) of the controlee. At block 804 the second code is also sent from the controlee 202 to the primary server 204.

At block 806 it is assumed that the controller detects the second code when, e.g., the controlee presents the second code audibly. Proceeding to block 808 the controller receives the spoken code and digitizes it, sending the digitized version (or the results of speech recognition performed thereon) to the secondary server 206, which sends the second code to the primary server 204 at block 810. At block 812 the primary server 204 identifies pairing as being authorized and informs the controlee of such to enable the controlee to respond to commands from the controller provided the second code received from the secondary server 206 matches that received by the primary server 204 at block 804.

While particular techniques and machines are herein shown and described in detail, it is to be understood that the subject matter which is encompassed by the present invention is limited only by the claims.

What is claimed is:

1. A system, comprising:
    at least one controlee device;
    at least one controller device to control the controlee device;
    at least one primary server;
    the controlee device being programmed with instructions to cause the controlee device to send a message including an identification of the controlee device to the primary server;
    the primary server being programmed with instructions to generate a first code and send the first code to the controlee device;
    the controlee device being programmed with instructions to present the first code;
    the controller device being programmed with instructions to receive first speech and send at least one first signal to a network on which the primary server communicates representing the first speech;
    the primary server being programmed with instructions to receive the first signal from the controller device and to compare information in the first signal from the controller device to the first code;
    the primary server being programmed with instructions to associate the controller device with the controlee device responsive to identifying that the information in the first signal from the controller device matches the first code;
    the primary server being programmed with instructions to command the controlee device to commence a second pairing step;
    the controlee device being programmed with instructions to, responsive to the command from the primary server, generate a second code;
    the controlee device being programmed with instructions to present the second code;
    the controlee device being programmed with instructions to send the second code to the primary server;
    the controller device being programmed with instructions to receive second speech and to send at least one second signal representative thereof to the network;
    the primary server being programmed with instructions to receive the second signal from the controller device and to compare information in the second signal from the controller device to the second code; and
    the primary server being programmed with instructions to authorize pairing of the controller device with the controlee device responsive to identifying that the information in the second signal from the controller device matches the second code.

2. The system of claim 1, wherein the primary server is programmed with instructions to command the controlee device to accept pairing with the controller device responsive to identifying that the information in the second signal from the controller device matches the second code.

3. The system of claim 1, wherein the primary server is programmed with instructions to not authorize pairing of the controller device and controlee device responsive to a timeout period being exceeded.

4. The system of claim 1, wherein the controlee device is programmed with instructions to present the first code visibly.

5. The system of claim 1, wherein the controlee device is programmed with instructions to present the first code audibly.

6. The system of claim 1, wherein the first signal includes a digitized representation of the first speech.

7. The system of claim 1, wherein the first signal includes an output of speech recognition executed on a digitized version of the first speech.

8. The system of claim 1, wherein the second code is different from the first code.

9. A device comprising:
    at least one computer medium that is not a transitory signal and that comprises instructions executable by at least one processor to:
    send an identification of a controlee device to a primary server;
    receive a first code from the primary server;
    display the first code on the controlee device such that a controlled device can receive first speech responsive to the first code and send at least one first signal to a network on which the primary server communicates representing the first speech such to the primary server;
    responsive to a command from the primary server, generate a second code different from the first code;

display the second code;
send the second code to the primary server such that the primary server can receive a second signal from the controller device representing second speech responsive to the second code and compare information in the second signal from the controller device to the second code; and
responsive to receiving from the primary server a signal to pair with the controller device, authorize pairing with the controller device such that the instructions are executable to execute commands from the controller device.

10. The device of claim 9, wherein the instructions are executable to display the first code audibly.

11. The device of claim 9, wherein the instructions are executable to display the first code visibly.

12. The device of claim 9, wherein the instructions are executable to generate the second code responsive to a command from the primary server.

13. The device of claim 9, wherein the signal to pair with the controller device is received responsive to the primary server identifying that both the first code and second code were spoken into the controller device.

14. A method comprising:
generating a first code;
sending the first code to a controlee device for presentation of the first code by the controlee device;
receiving from a controller device a network signal including first information derived from speech received by the controller device and associated with the first code;
responsive to identifying that the first information matches the first code, sending a message to the controlee device to generate a second code for display thereof on the controlee device;
receiving a network signal from the controller device including second information derived from speech received by the controller device and associated with the second code, comparing information in the network signal from the controller device to the second code; and responsive to identifying that the second information matches the second code, and sending a message to the controlee device to authorize pairing with the controller device.

15. The method of claim 14, comprising:
responsive to identifying that the first information does not match the first code, not sending a message to the controlee device to generate the second code.

16. The method of claim 14, comprising:
responsive to not receiving the first information within a timeout period, not sending a message to the controlee device to generate the second code even if the first information is subsequently received and matches the first code.

17. The method of claim 14, comprising:
responsive to identifying that the second information does not match the second code, not sending a message to the controlee device to pair with the controller device.

18. The method of claim 14, comprising:
responsive to not receiving the second information within a timeout period, not sending a message to the controlee device to pair with the controller device if the second information is subsequently received and matches the second code.

19. The method of claim 14, comprising receiving the first information from a secondary server.

* * * * *